Figure 1:
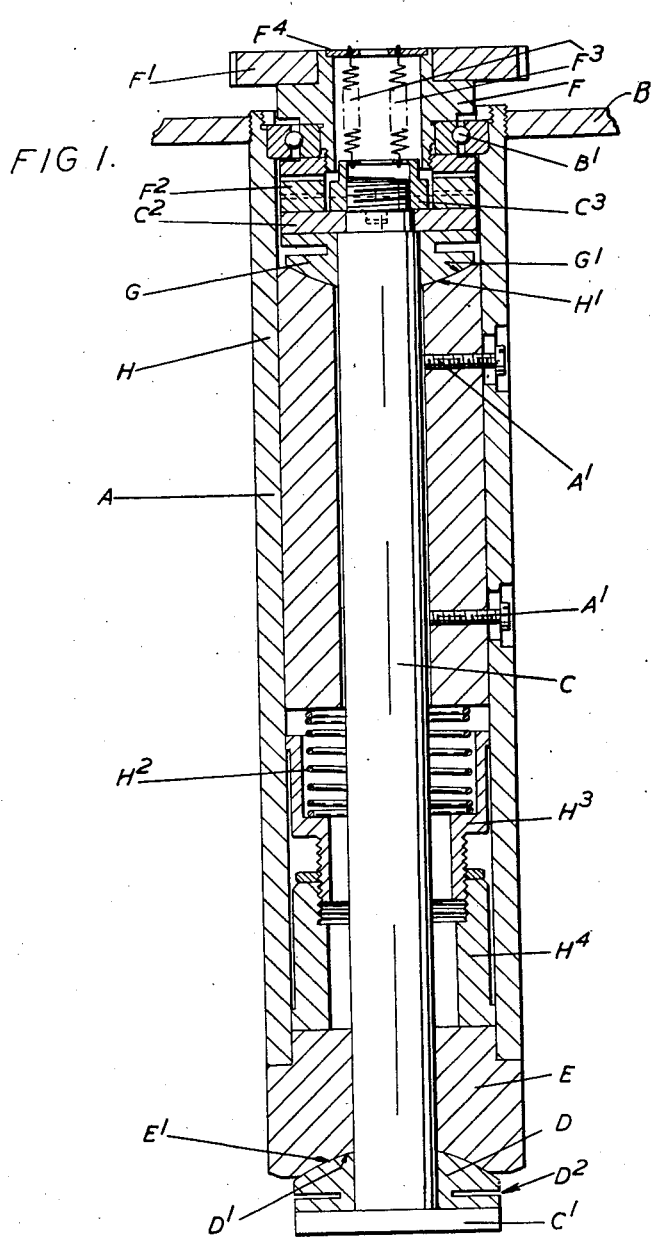

Feb. 1, 1955  R. E. REASON ET AL  2,701,170

SPINDLE MOUNTING

Filed Aug. 18, 1952  3 Sheets-Sheet 1

*Inventor*
RICHARD E. REASON
GEORGE O. ROWSTRON
By
Emery Holcombe & Blair
*Attorney*

Inventor
RICHARD E. REASON
GEORGE O. RAWSTRON

United States Patent Office 2,701,170
Patented Feb. 1, 1955

2,701,170

SPINDLE MOUNTING

Richard Edmund Reason and George Ormerod Rawstron, Leicester, England, assignors to Kapella Limited, Leicester, England, a company of Great Britain Application August 18, 1952, Serial No. 305,042

Claims priority, application Great Britain August 20, 1951

13 Claims. (Cl. 308—140)

This invention relates to a spindle mounting, for use in a machine or a measuring instrument, for example an instrument for measuring or testing the roundness of a surface, and has for its object to provide a spindle mounting such that the position of the axis of rotation of the spindle is maintained constant in space with a high degree of accuracy.

The spindle mounting according to the invention comprises a rotary spindle having at one end an accurate spherical bearing surface, a fixed hollow housing surrounding the spindle, an accurate spherical bearing surface formed on the housing or on a member held against rotation therein and cooperating with that on the spindle, the two cooperating spherical bearing surfaces not only defining a point on the axis of rotation of the spindle but also affording an axial thrust bearing for the spindle, and bearing means at the other end for accurately defining a second point on the axis of rotation of the spindle.

The bearing means at the second end may take various forms. In one arrangement it comprises cooperating spherical bearing surfaces on the spindle and on a bearing member held against rotation in the housing. In this arrangement, it is desirable so to mount this bearing member in the housing that it can initially be axially adjusted therein to give with a high degree of accuracy the desired axial separation between the two non-rotating spherical bearing surfaces, to ensure the optimum thickness of oil film at each bearing, and can be permanently clamped in such position of adjustment.

In another arrangement, the bearing means at the second end comprises cooperating tapered bearing surfaces on the spindle and on a bearing member held against rotation in the housing, the included angle of the taper being small and of the order of a few degrees only, usually less than three degrees. In this case, the bearing member is preferably positioned in the housing by means of a ring of balls in a cage therein, whereby any slight inaccuracy there may be in alignment of the spindle taper axis with the centre of the spherical bearing at the other end of the spindle can be taken up.

In yet another alternative, the bearing means at the second end comprises a V-notch fitting in the housing, in which a cylindrical portion of the spindle engages. This V-notch fitting preferably consists of a cylindrical sleeve of soft metal slightly relieved on one side, spring means being provided for urging the cylindrical portion of the spindle into engagement with the two edges formed by such relieving.

It will usually be convenient to mount the spindle vertically, with the spherical bearing at its lower end, and a spring may be provided to take at least part of the weight of the spindle and the parts driven thereby.

The spindle is preferably driven through a flexible joint, which may conveniently take the form of an Oldham's coupling.

Figure 2:
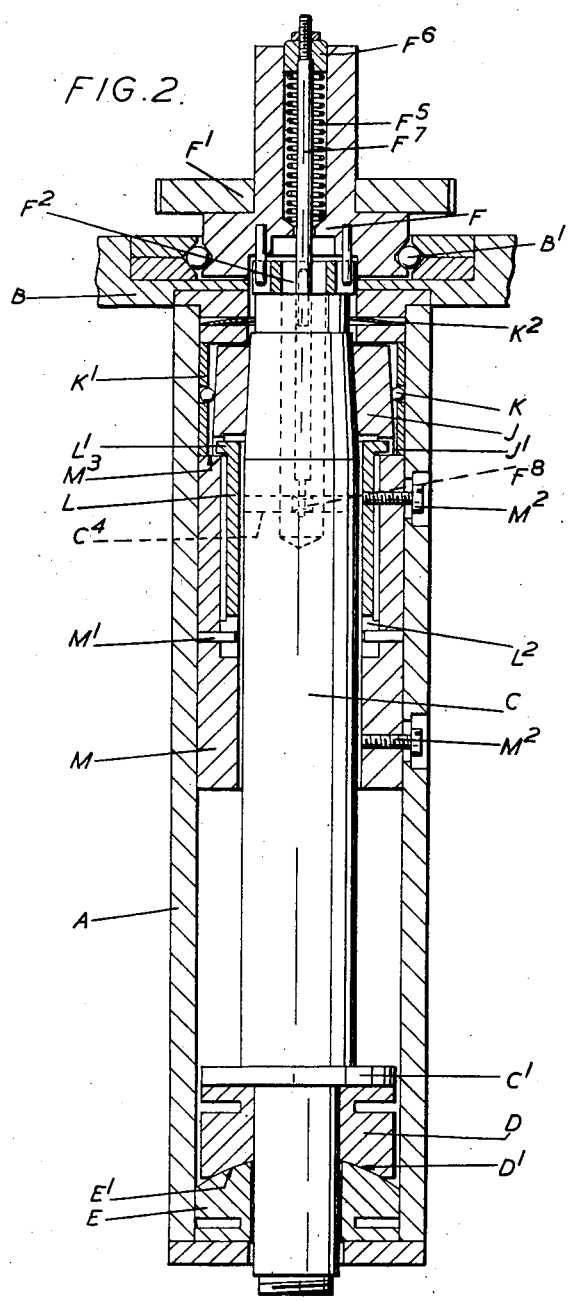
Figure 3:
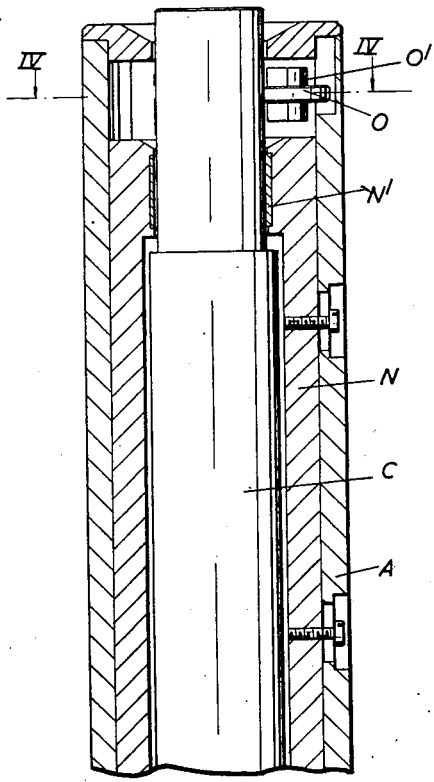
Figure 4:
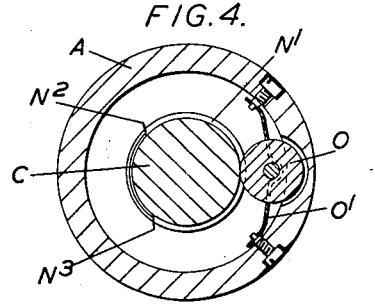

In the accompanying drawings,

Figures 1, 2 and 3 respectively illustrate in central vertical section three convenient alternative constructions of spindle mounting according to the invention, and Figure 4 is a transverse section on the line IV—IV of Figure 3.

In the construction of Figure 1, the spindle is mounted vertically within a cylindrical hollow housing A, which may conveniently be termed a "quill" and is rigidly suspended from a casing B containing the driving mechanism for the spindle.

The spindle itself consists of a rod C, having a horizontally projecting flange $C^1$ at its lower end, to which is bolted an annular bearing member D surrounding the lower end of the spindle above the flange $C^1$ and having a spherical outer surface $D^1$. A deep slot $D^2$ is cut in this annular bearing member D to ensure that the spherical bearing surface $D^1$ is not subjected to any strain due to its bolting to the flange $C^1$, and this slot may also serve to accommodate the nuts on the securing bolts. The spherical bearing surface $D^1$ is shaped with a high degree of accuracy to have its centre in alignment with the axis of the spindle C, and cooperates with a mating spherical bearing surface $E^1$ formed on a member E secured to the lower end of the quill A to act both as a rotational bearing and as a thrust bearing.

The drive for the spindle C is obtained from a suitable source which is connected through gearing $F^1$ housed in the casing B at the upper end of the spindle to a member F rotatable in ball bearings $B^1$ supported in such casing B, and thence to the spindle C through an Oldham's coupling, comprising a disc $F^2$ connected through pin and slot couplings both to a flange $C^2$ on the spindle and to the said gear-driven member F. This arrangement ensures that no force other than a true rotational torque about the spindle axis is transmitted to the spindle from the driving mechanism.

The spindle bearings are relieved of at least a portion of the axial thrust due to the weight of the spindle and of parts connected to it by means of one or more springs $F^3$ which connect a member $C^3$ secured to the spindle C to a plate $F^4$ carried by the gear-driven member F, part of the axial thrust thus being taken by the ball bearings $B^1$ in the upper casing B.

In order to ensure the desired accuracy in locating the axis of the spindle C within the fixed quill A, it is necessary to provide, in addition to the spherical bearing at the lower end, bearing means for accurately defining a second point on the axis of rotation of the spindle at the upper end. In the construction of Figure 1, this bearing means at the upper end takes the form of another spherical bearing generally similar to that at the lower end. Thus an annular bearing member G having a spherical outer surface $G^1$ is secured to the flange $C^2$ on the upper end of the spindle C, the spherical bearing surfaces at the two ends of the spindle being oppositely directed, for example convex towards one another as shown. The cooperating spherical bearing surface $H^1$ at the upper end is formed on a sleeve H, which is housed within the quill A and surrounds the spindle C with adequate clearance therefrom. This sleeve H, after having been adjusted to the correct position in the manner described below, is firmly secured to the quill A.

It will be appreciated that, since the use of spherical bearings at both ends defines the axis of rotation by means of two points only, namely the centres of the two spheres, and since also the spherical surfaces can be produced with great accuracy this arrangement will ensure rotation of the spindle without shake about a highly accurately located axis, provided that the axial separation between the two bearing surfaces $E^1$ and $H^1$ secured to the quill can be accurately suited that between the two bearing surfaces $D^1$ and $G^1$ on the spindle in order to ensure the ideal thickness of oil film at each bearing.

The necessary adjustment of the axial position of the sleeve H carrying the upper spherical bearing surface $H^1$, for this purpose, is ensured by means of a helical spring $H^2$ surrounding the spindle C and urging the sleeve H upwards, the lower abutment $H^3$ of this spring $H^2$ being screwthreaded to a member $H^4$ abutting against the lower annular bearing member E. The correct axial pressure for the oil film is determined experimentally by running the spindle in turn with various settings of the screwthreaded abutment $H^3$ until the best running conditions are obtained, the spindle being run for a period sufficient to produce a uniform oil film. When this position of equilibrium has been fully determined, clamping screws $A^1$ passing through slots in the quill A and engaging in the bearing sleeve H are securely tightened up, thus permanently fixing the bearing surfaces in their correct axial positions.

The construction of Figure 2 differs from that of Figure 1 primarily in that it employs a taper bearing instead of a spherical bearing at the upper end, but this figure does also serve to show some minor constructional variants in the remaining parts, the same reference letters, however, being used for corresponding parts even if of somewhat modified construction.

Thus, the Oldham's coupling, through which the spindle C is driven, is in this instance located within the ball bearings $B^1$, instead of beneath them, and the gear-driven member F has an upward cylindrical extension housing a single compression spring $F^5$, which replaces the tension springs $F^3$ of Figure 1 and abuts against a boss $F^6$ connected through a rod $F^7$ passing down through the hollow interior of the spindle C to a hook $F^8$ engaging with a cross-bar $C^4$ secured to the spindle.

Another variant is that, in the spherical bearing at the lower end, the bearing member D is in this instance beneath the flange $C^1$ on the spindle and has its inner surface $D^1$ formed spherical for bearing engagement with the mating spherical bearing surface $E^1$ on the outer surface of the member E secured to the lower end of the quill A.

The taper bearing at the upper end is provided by forming the upper end of the spindle C with a very slight taper, such for example that the diameter changes by .015 inch in 1 inch axial length. A non-rotating sleeve J having a corresponding slight taper on its inner and outer surfaces, engages at its inner surface with the tapered portion of the spindle C and at its outer surface with a ring of balls K mounted in a cage $K^1$ within the quill A. The lower end of the taper sleeve J is provided with slots $J^1$ in which engage projections $L^1$ on another sleeve L loosely surrounding the spindle C, such sleeve L also having slots $L^2$ at its lower end to engage pins $M^1$ projecting from an annular abutment member M which is clamped by means of screws $M^2$ to the quill A in such a position that its upper end $M^3$ abuts against the lower end of the taper sleeve J. The ball cage $K^1$ is also pressed against the upper end $M^3$ of the abutment member M by means of a spring-urged disc $K^2$, the parts being accurately dimensioned and adjusted to the correct positions. A slight clearance is left between the upper end of the taper sleeve J and the spring-urged disc $K^2$ engaging with the ball cage $K^1$.

The use of only a slight angle of taper in this arrangement has the double advantage that the taper surfaces can be produced by lapping with a high degree of accuracy and that the taper sleeve J will automatically seat itself at exactly the correct position on the spindle taper to ensure the correct thickness of oil film. If there should happen to be any slight error in alignment of the axis of the tapered surface of the spindle with the centre of the spherical bearing at the lower end, such axis would not coincide exactly with the axis of rotation, but any slight error in this respect will be taken up by the ball mounting K of the taper sleeve J, since (owing to the clearance between the taper sleeve and the spring-urged disc $K^2$ above it) the taper sleeve is free to move up and down slightly within the ball mounting K. It will thus be clear that the axis of rotation is really defined by two points, namely the centre of the spherical bearing at the lower end and the centre of the ring of balls K at the upper end, notwithstanding any slight error there may be in alignment of the taper axis with the centre of the spherical bearing.

The construction of Figures 3 and 4 differs from those of Figures 1 and 2 in employing a V-notch fitting for the upper bearing of the spindle C, the remaining parts not shown in Figure 3 being arranged as in Figure 1 or Figure 2. In this case, the spindle C is formed at its upper end with a cylindrical bearing surface, which rotates within a soft metal lining $N^1$ on the inner surface of a sleeve N clamped to the quill A. This lining $N^1$ is slightly relieved on one side as shown in Figure 4, so as to afford two edges $N^2 N^3$ against which the bearing surface on the spindle C is pressed by means of a roller O urged by a spring $O^1$ against the opposite face of the spindle. Any slight lack of alignment between the axis of the V formed by the two edges $N^2 N^3$ and the centre of the spherical bearing at the lower end will quickly be taken up by wear of the soft metal. It is important in this construction to produce the cylindrical bearing surface on the spindle C in alignment with the centre of the spherical bearing with a high degree of accuracy, since the construction does not provide automatic compensation for any error in this respect, but in practice this does not create serious difficulty. Although, therefore, this third construction will not, in theory, locate the upper end of the spindle so accurately as either of the first two constructions, the errors can in practice be made so extremely small as to be negligible.

In all these constructions suitable arrangements are made for ensuring a proper supply of oil to the bearing surfaces to maintain the oil films.

What we claim as our invention and desire to secure by Letters Patent is:

1. An accurate spindle mounting, comprising a vertically mounted rotary spindle, an accurate spherical bearing surface carried by the spindle near the lower end thereof, a fixed hollow housing surrounding the spindle, an accurate spherical bearing surface carried by the housing and cooperating with the spherical bearing surface on the spindle, the two cooperating bearing surfaces not only defining a point on the axis of rotation of the spindle but also affording an axial thrust bearing for the spindle, bearing means near the upper end of the spindle for accurately defining a second point on the axis of rotation of the spindle, a driving member at the upper end of the spindle, a flexible coupling through which the spindle is driven by such driving member, and spring supporting means cooperating with the driving member and the spindle and acting to support at least part of the weight of the spindle and parts driven thereby.

2. An accurate spindle mounting as claimed in claim 1, in which the flexible coupling comprises a floating member, and pin and slot couplings connecting the floating member respectively to the driving member and to the spindle for transmitting a rotational torque from the driving member to the floating member and from the floating member to the spindle but otherwise leaving the floating member free to move.

3. An accurate spindle mounting as claimed in claim 1, in which the bearing means near the upper end of the spindle comprises an accurate spherical bearing surface carried by the spindle, a bearing member held against rotation in the housing, and an accurate spherical bearing surface carried by such bearing member and cooperating with the spherical bearing surface on the spindle.

4. An accurate spindle mounting as claimed in claim 1, in which the bearing means near the upper end of the spindle comprises a bearing member held against rotation in the housing, and cooperating slightly tapered bearing surfaces on the spindle and on such bearing member.

5. An accurate spindle mounting, comprising a rotary spindle, an accurate spherical bearing surface carried by the spindle near one end thereof, a fixed hollow housing surrounding the spindle, an accurate spherical bearing surface carried by the housing and cooperating with the spherical bearing surface on the spindle, the two cooperating bearing surfaces not only defining a point on the axis of rotation of the spindle but also affording an axial thrust bearing for the spindle, bearing means near the other end of the spindle for accurately defining a second point on the axis of rotation of the spindle, a driving member, and a flexible coupling through which the spindle is driven by such driving member, the flexible coupling comprising a floating member, and pin and slot couplings connecting the floating member respectively to the driving member and to the spindle for transmitting a rotational torque from the driving member to the floating member and from the floating member to the spindle but otherwise leaving the floating member free to move relatively to the driving member and to the spindle.

6. An accurate spindle mounting as claimed in claim 5, in which the bearing means for defining the second point on the axis of rotation comprises an accurate spherical bearing surface carried by the spindle, a bearing member held against rotation in the housing, and an accurate spherical bearing surface carried by such bearing member and cooperating with the spherical bearing surface on the spindle.

7. An accurate spindle mounting as claimed in claim 5, in which the bearing means for defining the second point on the axis of rotation comprises a bearing member held against rotation in the housing, and cooperating slightly tapered bearing surfaces on the spindle and on such bearing member.

8. An accurate spindle mounting, comprising a rotary spindle, an accurate spherical bearing surface carried by the spindle near one end thereof, a fixed hollow housing surrounding the spindle, an accurate spherical bearing surface carried by the housing and cooperating with the spherical bearing surface on the spindle, the two cooperating bearing surfaces not only defining a point on the axis of rotation of the spindle but also affording an axial thrust bearing for the spindle, and bearing means near the other end of the spindle comprising a bearing member having a slightly tapered bearing surface cooperating with a similarly tapered bearing surface on the spindle, means for holding such bearing member against rotation in the housing, and mounting means for such bearing member permitting slight axial movement thereof, such means comprising a ball cage slidably mounted in the housing, a ring of balls in such cage with which a slightly tapered surface on the bearing member engages, and spring means for urging the ball cage axially in the housing into engagement with the said slightly tapered surface.

9. An accurate spindle mounting comprising a rotary spindle, an accurate spherical bearing surface carried by the spindle near one end thereof, a fixed hollow housing surrounding the spindle, an accurate spherical bearing surface carried by the housing and cooperating with the spherical bearing surface on the spindle, the two cooperating bearing surfaces not only defining a point on the axis of rotation of the spindle but also affording an axial thrust bearing for the spindle, and bearing means near the other end of the spindle comprising a bearing member having a slightly tapered bearing surface cooperating with a similarly tapered bearing surface on the spindle, means for holding such bearing member against rotation in the housing, and mounting means for such bearing member permitting slight axial movement thereof, a driving member at the upper end of the spindle, a flexible coupling through which the spindle is driven by such driving member, and spring supporting means cooperating with the driving member and the spindle and acting to support at least part of the weight of the spindle and parts driven thereby.

10. An accurate spindle mounting comprising a rotary spindle, an accurate spherical bearing surface carried by the spindle near one end thereof, a fixed hollow housing surrounding the spindle, an accurate spherical bearing surface carried by the housing and cooperating with the spherical bearing surface on the spindle, the two cooperating bearing surfaces not only defining a point on the axis of rotation of the spindle but also affording an axial thrust bearing for the spindle, and bearing means near the other end of the spindle comprising a bearing member having a slightly tapered bearing surface cooperating with a similarly tapered bearing surface on the spindle, means for holding such bearing member against rotation in the housing, and mounting means for such bearing member permitting slight axial movement thereof, a driving member, and a flexible coupling through which the spindle is driven by such driving member, the flexible coupling comprising a floating member and pin and slot couplings connecting the floating member respectively to the driving member and to the spindle for transmitting a rotational torque from the driving member to the floating member and from the floating member to the spindle but otherwise leaving the floating member free to move relatively to the driving member and to the spindle.

11. An accurate spindle mounting, comprising a rotary spindle, an accurate spherical bearing surface carried by the spindle near one end thereof, a fixed hollow housing surrounding the spindle, an accurate spherical bearing surface carried by the housing and cooperating with the spherical bearing surface on the spindle, the two cooperating bearing surfaces not only defining a point on the axis of rotation of the spindle but also affording an axial thrust bearing for the spindle, and bearing means near the other end of the spindle comprising a cylindrical bearing in the housing and having a pair of spaced bearing surfaces on one side of the axis of rotation, and spring means for urging the cylindrical bearing surface on the spindle into engagement with such spaced bearing surfaces.

12. An accurate spindle mounting as claimed in claim 11, mounted with the axis of rotation vertical, and including a driving member at the upper end of the spindle, a flexible coupling through which the spindle is driven by such driving member, and spring supporting means cooperating with the driving member and the spindle and acting to support at least part of the weight of the spindle and parts driven thereby.

13. An accurate spindle mounting as claimed in claim 11, including a driving member, and a flexible coupling through which the spindle is driven by such driving member, the flexible coupling comprising a floating member and pin and slot couplings connecting the floating member respectively to the driving member and to the spindle for transmitting a rotational torque from the driving member to the floating member and from the floating member to the spindle but otherwise leaving the floating member free to move relatively to the driving member and to the spindle.

References Cited in the file of this patent

UNITED STATES PATENTS

| 1,770,744 | Morgan | July 15, 1930 |

FOREIGN PATENTS

| 192,018 | Germany | Nov. 17, 1906 |
| 232,185 | Switzerland | Aug. 1, 1944 |